(12) United States Patent
Hayashikawa et al.

(10) Patent No.: US 7,194,015 B2
(45) Date of Patent: Mar. 20, 2007

(54) LASER OSCILLATING APPARATUS AND LASER WORKING MACHINE

(75) Inventors: Hiroyuki Hayashikawa, Toyonaka (JP); Hitoshi Hongu, Kawanishi (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/542,488

(22) PCT Filed: Dec. 8, 2004

(86) PCT No.: PCT/JP2004/018271

§ 371 (c)(1),
(2), (4) Date: Jul. 15, 2005

(87) PCT Pub. No.: WO2005/071805

PCT Pub. Date: Aug. 4, 2005

(65) Prior Publication Data

US 2006/0049147 A1  Mar. 9, 2006

(30) Foreign Application Priority Data

Jan. 22, 2004  (JP) ............................ 2004-013958

(51) Int. Cl.
  H01S 3/22   (2006.01)
  H01S 3/223  (2006.01)
(52) U.S. Cl. ................... 372/55; 372/57; 372/58
(58) Field of Classification Search .............. 372/55
See application file for complete search history.

(56) References Cited

U.S. PATENT DOCUMENTS 3,875,531 A  4/1975  Buczek et al.
5,073,687 A * 12/1991  Inagawa et al. ........ 219/121.7
5,856,992 A *  1/1999  Karube et al. ............. 372/58

FOREIGN PATENT DOCUMENTS

| EP | 1 056 171 A | 11/2000 |
| EP | 1 137 126 A | 9/2001 |
| JP | 04-302184 | * 10/1992 |
| JP | 04-302184 A | 10/1992 |
| JP | 10-173259 A | 6/1998 |
| JP | 10-184593 A | 7/1998 |
| JP | 2000-090460 A | 3/2000 |
| JP | 2002-187134 A | 7/2002 |
| JP | 2004-207467 | 7/2004 |
| WO | WO 89/02176 | 3/1989 |

OTHER PUBLICATIONS

Japanese International Search Report for application No. PCT/JP2004/018271 dated Mar. 15, 2005.
Form PCT/ISA/210.
Supplemental European Search Report for EP 04 82 1205, dated Jul. 20, 2006.

* cited by examiner

*Primary Examiner*—Armando Rodriguez
(74) *Attorney, Agent, or Firm*—RatnerPrestia

(57) ABSTRACT

A laser oscillating apparatus includes a discharger for exciting a laser medium, a blower for blowing a laser gas and a laser gas path for connecting the discharger and the blower, and a laser oscillating apparatus characterized in that the blower includes a shaft portion provided with a blade wheel portion at a front end thereof, a driving portion for rotating the shaft portion, and a partition wall portion for separating the blade wheel portion and the driving portion, and a surface of the partition wall portion is provided with a metal layer dispersing precipitated polytetrafluoroethylene (PTFE).

15 Claims, 5 Drawing Sheets

LASER OSCILLATING APPARATUS AND LASER WORKING MACHINE

This application is a U.S. national phase application of PCT International Application PCT/JP2004/018271.

TECHNICAL FIELD

The present invention relates to a laser oscillating apparatus and a laser working machine using a centrifugal blower.

BACKGROUND ART

FIG. 6 shows an example of an outline constitution of a laser oscillating apparatus of a background art. The laser oscillating apparatus of the background art will be explained in reference to FIG. 6.

The laser oscillating apparatus of the background art includes electrodes 2, 3 at a periphery of discharge tube 1 constituted by a dielectric member of glass or the like. Electrodes 2, 3 are respectively connected with power sources 4. Discharge space 5 is formed at inside of discharge tube 1 interposed by electrodes 2, 3. Further, a total reflection mirror and partial reflection mirror 7 are provided. Laser beam 58 is outputted from partial reflection mirror 7. Arrow mark 9 designates a direction in which laser gas flows. Further, heat exchangers 11, 12 for lowering a temperature of the laser gas, a temperature of which rises by discharge in discharge space 5 and by operation of a centrifugal blower, are provided. Laser gas is circulated by using blowing means 43. As blowing means 43, for example, a centrifugal blower, mentioned later, or the like is used. Laser gas flow path 10 and discharge tube 1 are connected by laser gas introducing portion 14.

FIG. 7 shows an example of an outline constitution of a laser working machine in the background art. The laser working machine of the background art will be explained in reference to FIG. 7.

Laser beam 58 outputted from the laser oscillating apparatus shown in FIG. 6 is reflected by reflecting mirror 15 and is guided to a vicinity of work 16. Laser beam 58 is converged into a high density energy beam by condenser lens 18 provided at inside of torch 17 and irradiated to work 16 to process the work 16. Work 16 is fixed on work table 19 and a predetermined shape is obtained by moving torch 17 relative to work 16 by X axis motor 20 or Y axis motor 21.

FIG. 8 shows a structure of a periphery of a centrifugal blower in the laser oscillating apparatus.

Motor 22 in centrifugal blower 43 includes motor rotor 22a in a direction orthogonal to a gravitational force direction (arrow mark G direction), and includes motor stator 22b on a lower side in the gravitational force direction (arrow mark G) (that is, lower side of drawing). A front end of shaft 29 coupled with rotor 22a is provided with blade wheel 23 and diffuser 24. Laser gas is sucked from suction port 25 from an upper direction in the gravitational force direction and is provided with kinetic energy by a centrifugal force by rotation of blade wheel 23. Thereafter, the kinetic energy is converted into pressure by diffuser 24 and a gas having pressure about 1.5 times as much as that of the suction port 25 is delivered from delivery port 26.

Oil 27 is contained at a portion of casing 31 containing motor 22 below centrifugal blower 43 and is used for lubricating bearing 28 and cooling rotor 22a. When oil mist generated from oil 27 invades laser gas circulated by blade wheel 23, a purity of laser gas is reduced to bring about a significant drawback in laser oscillation. Hence, in order to restrain oil mist from invading a laser gas circulating portion (that is, laser gas flow path 10), partition wall portion 50 is provided to separate motor chamber 54 and gas circulating chamber 35. A clearance (clearance 57 as shown by FIG. 9) of several 100 µm is provided between partition wall portion 50 and shaft 29 to thereby construct a constitution of not hampering rotation of the shaft.

As described above, the clearance of several 100 µm is present at partition wall portion 50 and therefore, oil mist invades gas circulating chamber 35 from motor chamber 54 by passing the clearance by vacuum diffusion. In order to prevent this, by always exhausting a constant amount of gas from motor chamber 54 by using vacuum pump 32, a pressure of motor chamber 54 is constituted by a pressure lower than that of gas circulating chamber 35. A path reaching vacuum pump 32 from motor chamber 54 is provided with electromagnetic valve 33, which is opened and closed as needed.

FIG. 9 shows a detailed structure of partition wall portion 50. Clearance 57 of several 100 µm is provided between shaft 29 and metal seal 36 and a constant amount of laser gas always flows to clearance 57. By the always flowing laser gas, invasion of oil mist from motor chamber 54 to gas circulating chamber 35 can be prevented.

Laser gas flowing through clearance 57 between shaft 29 and metal seal 36 is exhausted to outside as it is by vacuum pump 32 and therefore, it is necessary to supply an exhausted amount of laser gas to gas circulating chamber 35 by other route. This constitutes a consumption amount per unit time of laser gas in the laser oscillating apparatus and the laser working machine to share a large weight in running cost.

Therefore, it is a serious problem in view of reducing running cost how to reduce the consumption amount of laser gas per unit time. It is necessary to narrow clearance 57 in order to reduce the laser gas consumption amount. However, generally, laser gas passing through the clearance 57 includes sputtering particles by laser gas discharge and small unavoidable particles which are generated in a component assembling step. When clearance 57 is narrowed to about several 10 µm, there is a possibility of deteriorating reliability by clogging clearance 57 with the particles.

In the case of the background art of JP-A-10-184593, it is only disclosed to simply specify a shape and a dimension of metal seal 36 with regard to clearance 57 and it is not pointed out to prevent clogging of foreign matters as a problem.

Further, although JP-A-2004-207467 discloses an example of using a PTFE material at a partition wall portion and forming a minimum clearance by wearing PTFE by forcibly bringing the PTFE material and a rotating shaft into contact with each other, a high accuracy is difficult to ensure by the method.

DISCLOSURE OF THE INVENTION

A laser oscillating apparatus of the invention is an apparatus including discharging means for exciting a laser medium, blowing means for blowing a laser gas, and a laser gas path for connecting the discharging means and the blowing means, and is a laser oscillating apparatus characterized in that the blowing means is blowing means including a shaft portion provided with a blade wheel portion at a front end thereof, a driving portion for rotating the shaft portion and a partition wall portion for separating the blade wheel portion and the driving portion, and a surface of the partition wall portion is provided with a metal layer dispersing precipitated polytetrafluoroethylene (PTFE).

By the constitution, a highly reliable laser oscillating apparatus and a highly reliable laser working machine capable of reducing running cost by restraining a gas consumption amount and capable of being used stably over a long period of time can be realized.

DETAILED DESCRIPTION

An embodiment of the invention will be explained in reference to the drawings.

(Embodiment)

Figure 1:
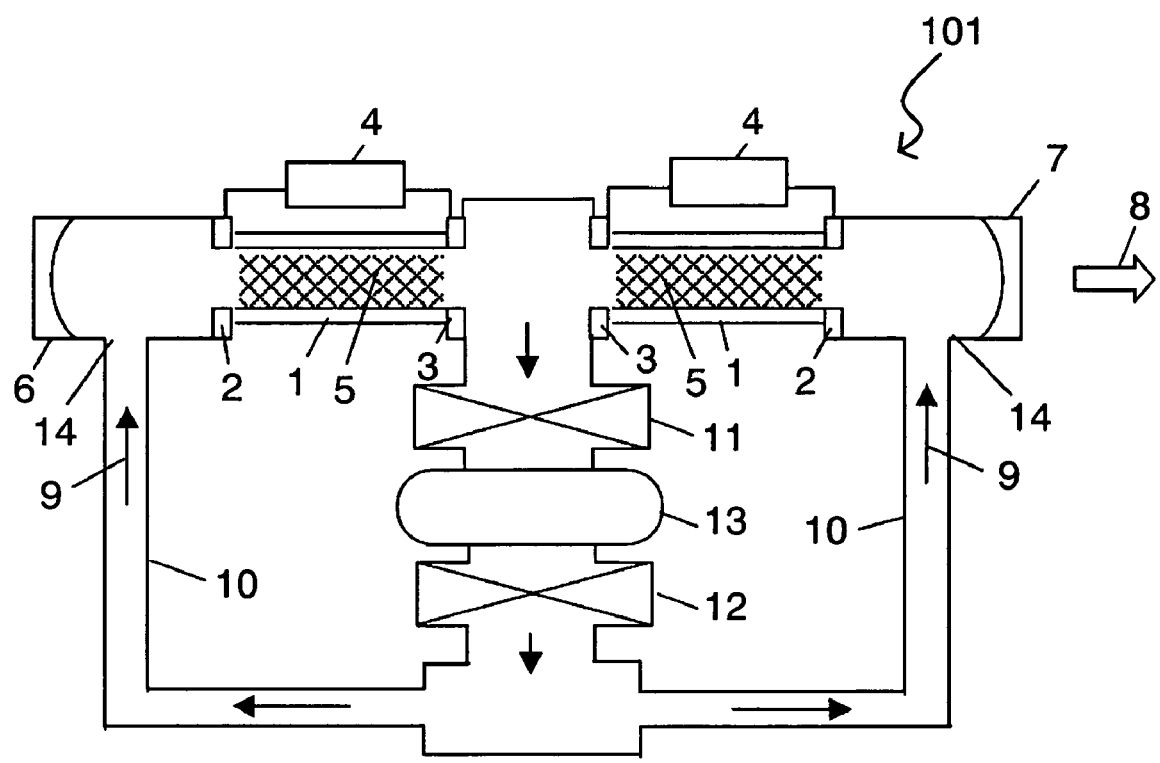
FIG. 1 is an outline constitution view of a laser oscillating apparatus according to an embodiment of the invention.

FIG. 1 shows an example of an outline constitution of laser oscillating apparatus 101 according to the embodiment and a detailed explanation will be given thereof in reference to FIG. 1 as follows.

Laser oscillating apparatus 101 includes discharge tube 1 made by a dielectric member and electrodes 2, 3 provided at a periphery of discharge tube 1. Electrodes 2, 3 are respectively connected to power source 4. A region interposed between electrodes 2, 3 is discharge space 5 at inside of discharge tube 1. Further, total reflection mirror 6 and partial reflection mirror 7 are provided and laser beam 8 is emitted from partial reflection mirror 7. Arrow mark 9 designates a direction in which laser gas flows.

Further, heat exchangers 11 and 12 for lowering a temperature of laser gas, a temperature of which rises by discharge in discharge space 5 and driving a centrifugal blower, are provided and as blowing means 13 for circulating laser gas, for example, a centrifugal blower or the like, mentioned later, is used. Laser gas flow path 10 and discharge tube 1 are connected by laser gas introducing portion 14.

Figure 2:
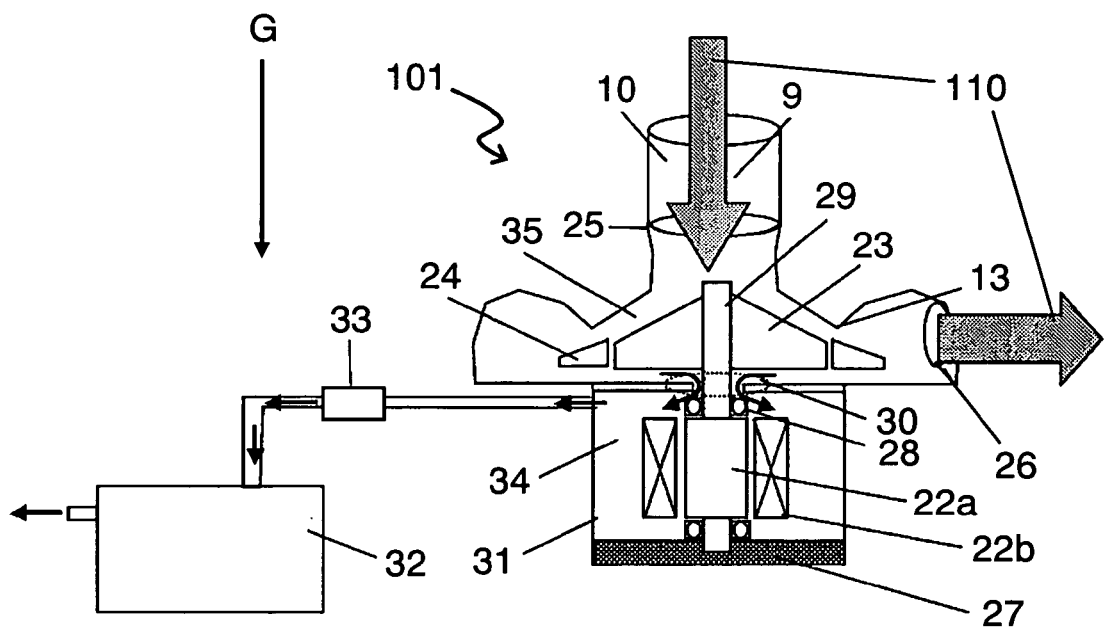
FIG. 2 is a view of a structure of a centrifugal blower portion of the laser oscillating apparatus according to the embodiment.

Next, FIG. 2 shows a structure of a periphery of a centrifugal blower in the laser oscillating apparatus.

Motor 22 provided by centrifugal blower 13 in a gravitational force direction (arrow mark G direction) is constituted by motor stator 22b and motor rotor 22a. Motor 22 includes rotor 22a in a direction orthogonal to the gravitational force direction (arrow mark G direction) and includes motor stator 22b on a lower side in the gravitational force direction (arrow mark G direction) (that is, lower side of drawing). A front end of shaft 29 coupled with rotor 22a is provided with blade wheel 23 and diffuser 24. Laser gas 110 is sucked from suction port 25 from an upper direction in the gravitational force direction and is provided with kinetic energy by a centrifugal force by rotation of blade wheel 23. Thereafter, the kinetic energy is converted into pressure by diffuser 24 and the gas having a pressure about 1.5 times as much as that of suction port 25 is delivered from delivery port 26.

Figure 3:
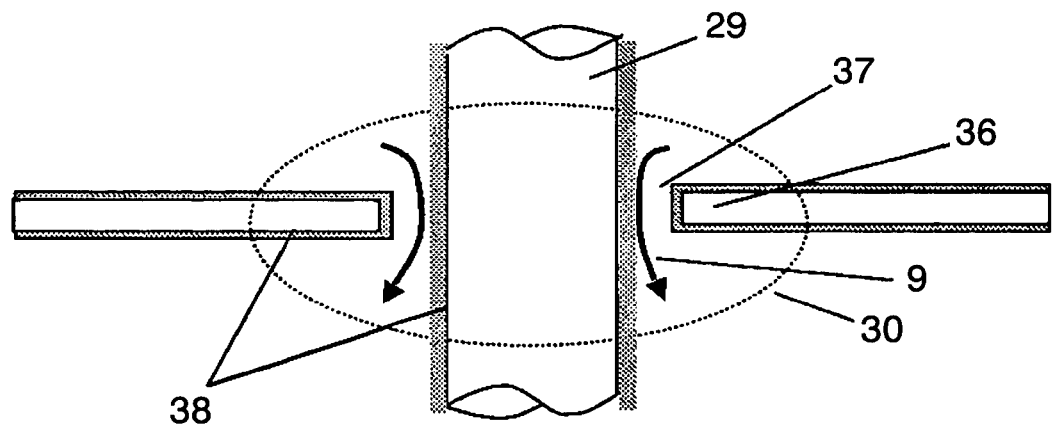
FIG. 3 is a view of a structure of a partition wall portion of the laser oscillating apparatus according to the embodiment.

Oil 27 is contained at a portion of casing 31 containing motor 22 at a lower portion of centrifugal blower 13, and is used for lubricating bearing 28 and cooling rotor 22a. When oil mist generated by oil 27 invades inside of laser gas 110 circulated by blade wheel 23, a purity of laser gas 110 is reduced to bring about a significant drawback in laser oscillation. Therefore, partition wall portion 30 is provided in order to restrain oil mist from invading a laser gas circulating portion (laser gas flow path 10) and separates motor chamber 34 and gas circulating chamber 35. As shown by FIG. 3, partition wall portion 30 is constituted by metal seal 36 and shaft 29 at a vicinity of metal seal 36. Clearance 37 is provided between metal seal 29 and shaft 29 and is constructed by a constitution of not hampering rotation of the shaft.

As shown by FIG. 3, clearance 37 is included in partition wall portion 30 and therefore, normally, oil mist passes through the clearance and invades gas circulating chamber 35 from motor chamber 34 by vacuum diffusion. As a countermeasure thereagainst, there is constructed a constitution in which a constant amount of gas is always exhausted from motor chamber 34 by vacuum pump 32 and a pressure of motor chamber 34 is lower than that of gas circulating chamber 35 and electromagnetic valve 33 provided between motor chamber 34 and vacuum pump 32 are opened and closed as needed.

The constant amount of laser gas always flows at clearance 37 between shaft 29 and metal seal 36. That is, since laser gas always flows through clearance 37, oil mist can be prevented from invading gas circulating chamber 35 from motor chamber 34.

Normally, shaft 29 is made of stainless steel and metal seal 36 is constituted by a copper containing material. In contrast thereto, according to the embodiment, surfaces of shaft 29 and metal seal 36 are coated by coating 38 of nickel plating including polytetrafluoroethylene (PTFE) particles. Further, nickel plating including PTFE particles refers to nickel Teflon plating by electroless plating for example and PTFE particles are uniformly dispersed and precipitated in a skin film plated by nickel. ("Teflon" is a registered trade mark of PTFE by DuPont Corporation)

Since the surface of metal seal 36 and the surface of shaft 29 are coated by nickel plating including PTFE particles, in contrast to a normal metal surface which is not subjected to the above-described coating processing, the surfaces are very excellent in a sliding property. Therefore, even when a foreign material invades clearance 37, a possibility of bringing about a drawback of clogging the clearance when the foreign material invades or the like can be reduced. Further, the surface subjected to nickel Teflon plating by electroless plating is provided with excellent water repellency. Therefore, there is also achieved an effect of reducing adherence of a particularly wet foreign material to the surface of coating 38 in clearance 37.

According to the embodiment, clearance 37 can be made to be infinitely smaller than several 100 μm of the background art in a range permitted by a machining accuracy. Therefore, an amount of laser gas passing through clearance 37 can be reduced and a significant reduction in running cost can be achieved by restraining a laser gas consumption amount per unit time. Specifically, clearance 37 can be reduced to 20 μm. Even in this case, high speed rotation (700 Hz) of shaft 29 can be permitted.

As described above, in the present embodiment, resin is included in the metal material by 15% or more and 60% or less. Therefore, a dimensional accuracy can be ensured by the metal material and the sliding property can be ensured by the resin material. That is, the dimensional accuracy and the sliding property can be made to be compatible with each other. Particularly, a constitution of including PTFE, which has high sliding property among resins, in electroless plating whose major component is nickel is excellent in obtaining compatibility of the dimensional accuracy and the sliding property. Further, when a gas is generated from the resin material or the metal material used in the process, the generated gas is mixed into laser gas to deteriorate a laser characteristic. Nickel and PTFE are preferably in view of reducing occurrence of such a problem.

Figure 4:
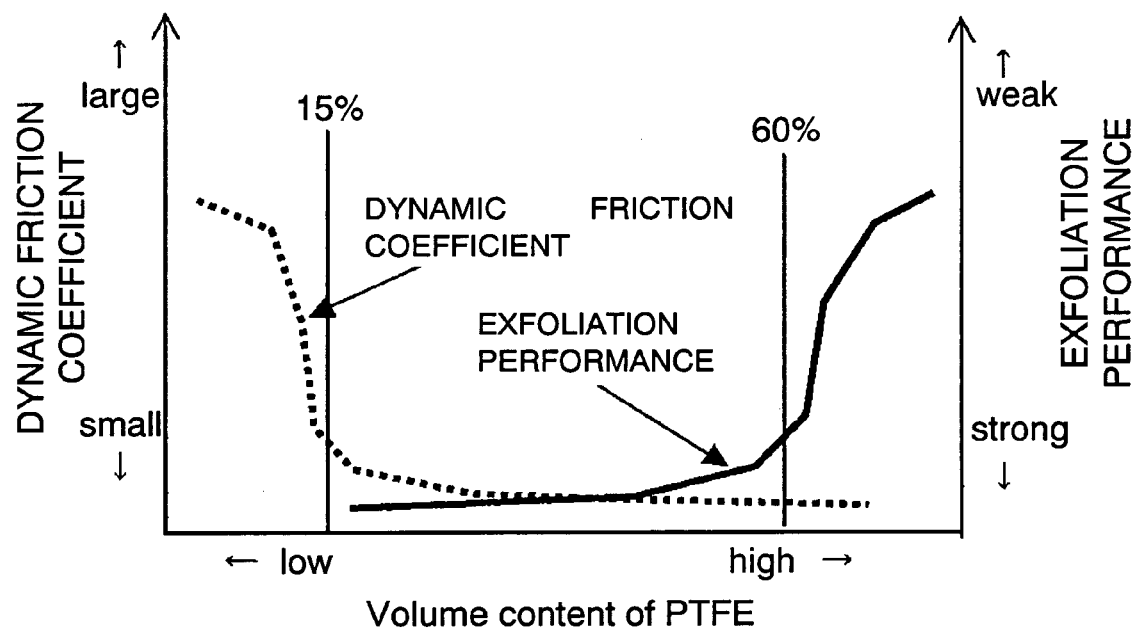
FIG. 4 is a diagram showing volume content, dynamic friction coefficient and exfoliation performance of polytetrafluoroethylene included in nickel plating according to the embodiment.

FIG. 4 shows volume content, a dynamic friction coefficient and an exfoliation performance of PTFE included in nickel plating. It is found that when the volume content of PTFE is less than 15%, the dynamic friction coefficient is increased and a sufficient sliding performance cannot be ensured. On the other hand, when the volume content of PTFE is larger than 60%, separation of PTFE particles from the plated metal is brought about and coating per se cannot be ensured. Therefore, it is preferable that the volume content of PTFE is equal to or larger than 15% and equal to or smaller than 60%.

Figure 5:
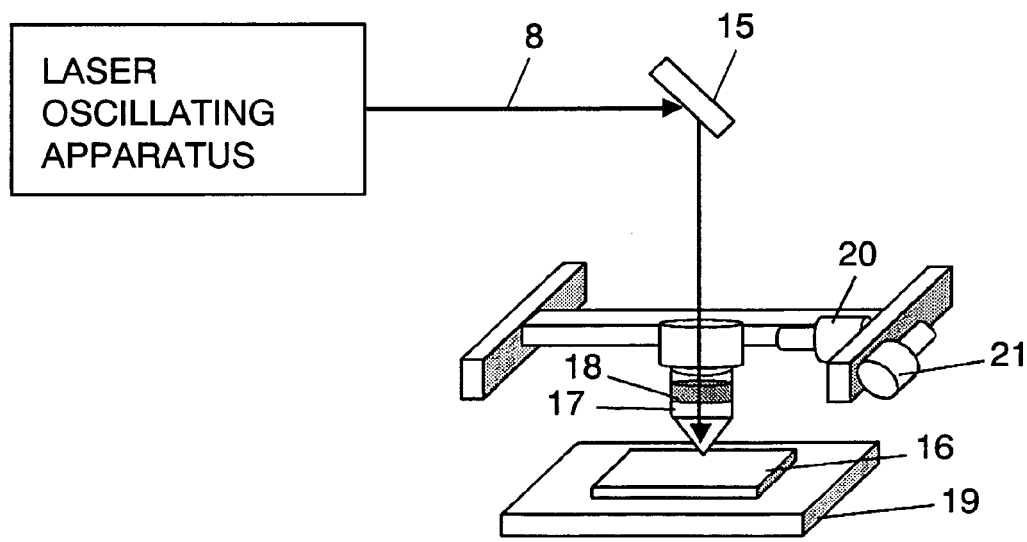
FIG. 5 is an outline constitution view of a laser working machine according to the embodiment.
Figure 6:
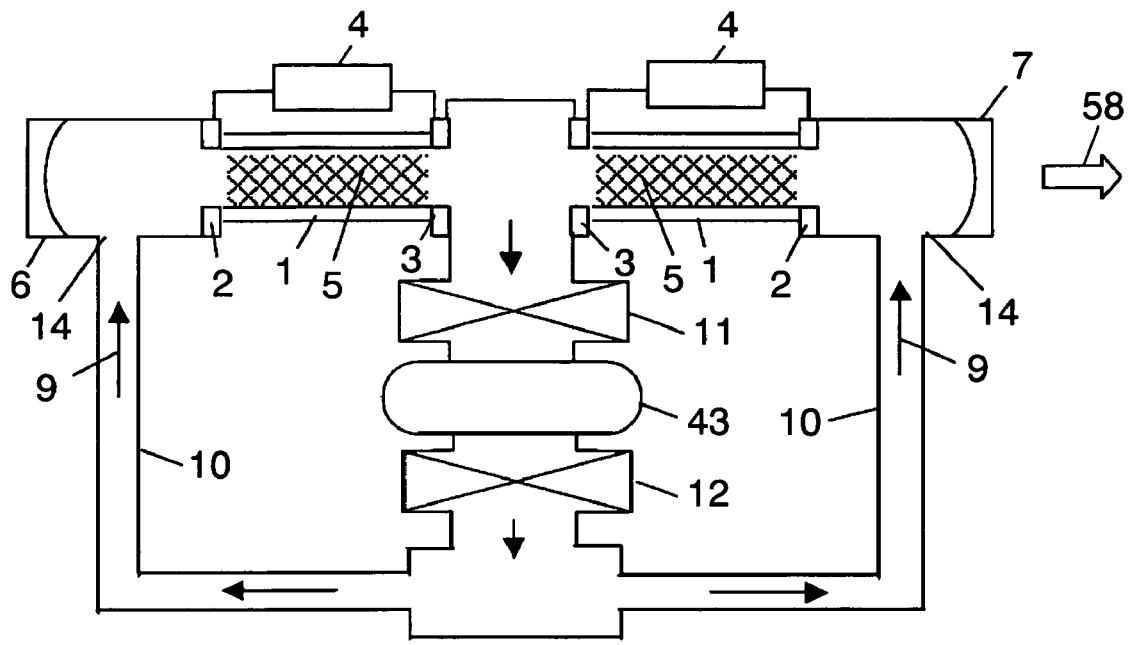
FIG. 6 is an outline constitution view of a laser oscillating apparatus of a background art.
Figure 7:
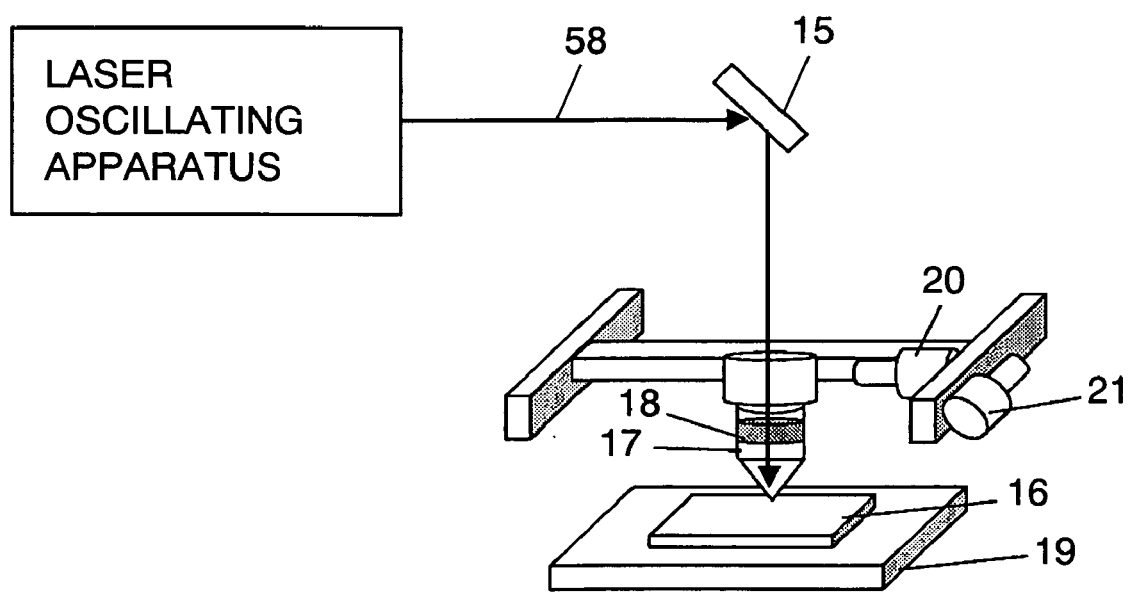
FIG. 7 is an outline constitution view of a laser working machine according to a background art.
Figure 8:
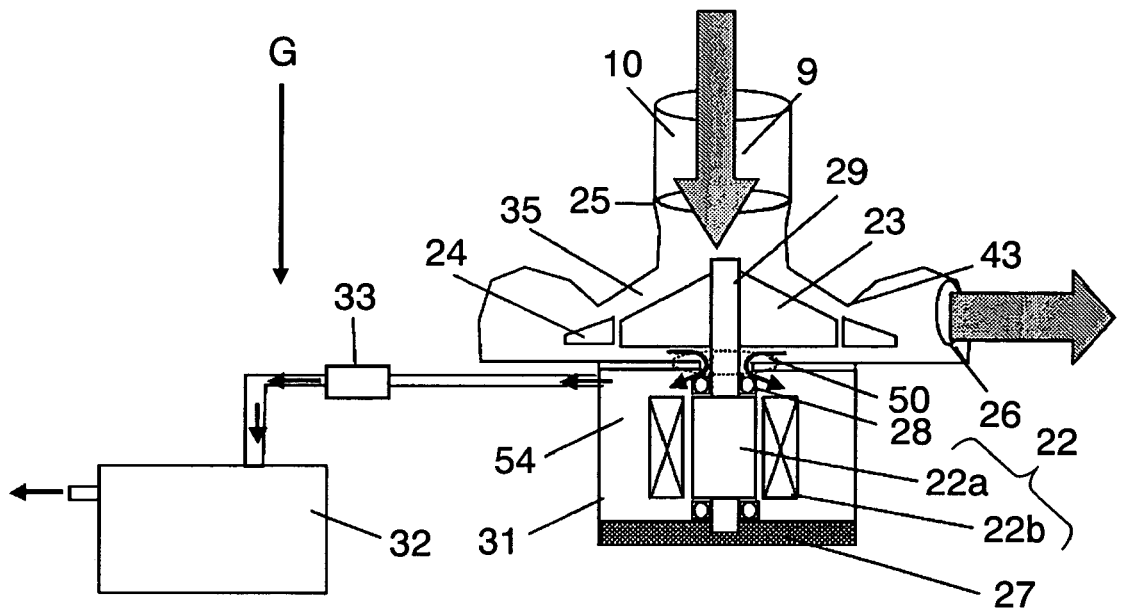
FIG. 8 is a view of a structure of a centrifugal blower portion of the laser oscillating apparatus of the background art.
Figure 9:
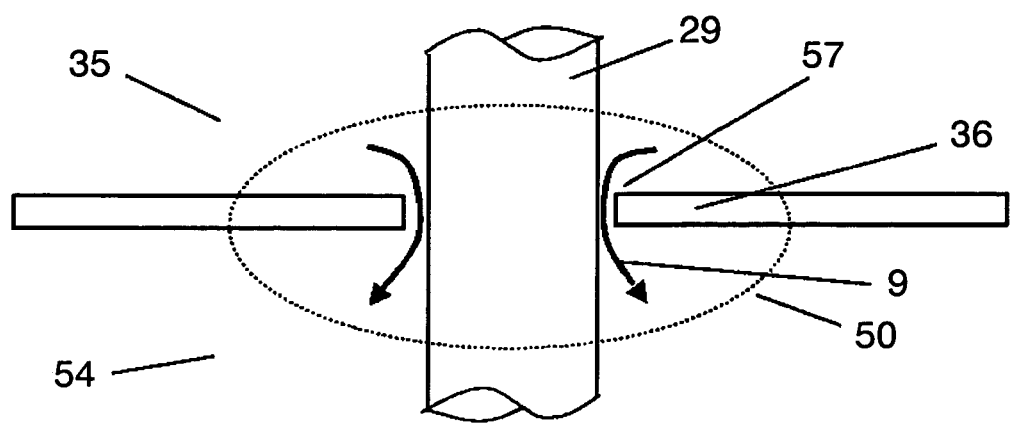
FIG. 9 is a view of a structure of a partition wall portion of the laser oscillating apparatus and the laser working machine of the background art.

FIG. 5 shows an example of an outline constitution of a laser working machine according to the embodiment. The laser working machine will be explained in reference to FIG. 5.

Laser beam 8 outputted from the laser oscillating apparatus explained in reference to FIG. 1 is reflected by reflecting mirror 15 and is guided to a vicinity of work 16. Laser beam 8 is converged into a high density energy beam by condenser lens 18 provided at inside of torch 17 and is irradiated to work 16 to process work 16. Work 16 is fixed on work table 19 and torch 17 in which X axis motor 20 or Y axis motor 21 is controlled by a numerical control apparatus (not illustrated) is moved relative to work 16 to thereby process the work in a predetermined shape. Further, a predetermined shape may be processed by controlling to drive work table 19 by a numerical control apparatus.

Further, a predetermined shape may be worked by controlling to drive both of torch 17 and work table 19 by a numerical control apparatus.

INDUSTRIAL APPLICABILITY

The laser oscillating apparatus and the laser working machine of the invention can provide a highly reliable laser oscillating apparatus and a highly reliable laser working machine which can reduce running cost particularly by restraining a gas consumption amount and can stably be used over a long period of time and are industrially useful.

The invention claimed is:

1. A laser oscillating apparatus comprising:
   discharging means for exciting a laser medium;
   blowing means for blowing a laser gas; and
   a laser gas path connecting the discharging means and the blowing means,
   wherein the blowing means includes:
      a shaft portion provided with a blade wheel portion at a front end thereof;
      a driving portion for rotating the shaft portion; and
      a partition wall portion for separating the blade wheel portion and the driving portion, and
   the partition wall portion and the shaft portion both having there between a metal layer wherein a precipitated resin is dispersed in the metal layer.

2. The laser oscillating apparatus according to claim 1, wherein the partition wall portion comprises a metal seal and a shaft inserted through a through hole provided at the metal seal, and the metal layer dispersing a precipitated resin is provided at a surface of the through hole of the metal seal and a surface of the shaft portion opposed to the through hole.

3. The laser oscillating apparatus according to claim 1, wherein the resin is polytetrafluoroethylene (PTFE).

4. The laser oscillating apparatus according to claim 1, wherein the metal layer and resin form a film formed by an electroless plating method.

5. The laser oscillating apparatus according to claim 3, wherein a volume content of the PTFE is equal to or larger than 15% and equal to or smaller than 60%.

6. The laser oscillating apparatus according to claim 1, wherein the partition wall portion comprises a metal seal formed with the metal layer and resin and the shaft portion formed with the metal layer and resin, and a surface of the metal seal and a surface of the shaft portion opposed to each other constitute a minimum clearance in a range permitted by a machining accuracy.

7. A laser working machine comprising:
   a work table;
   driving means for moving at least one of the work table and a torch for laser working;
   a numerical control apparatus for controlling the driving means; and
   a laser oscillating apparatus,
   wherein the laser oscillating apparatus includes:
      discharging means for exciting a laser medium;
      blowing means for blowing a laser gas; and
      a laser gas path for connecting the discharging means and the blowing means, the blowing means includes:
         a shaft portion provided with a blade wheel portion at a front end thereof;
         a driving portion for rotating the shaft portion; and
         a partition wall portion for separating the blade wheel portion and the driving portion,
         wherein a surface of the partition wall portion facing the shaft portion is at least partially coated by a metal layer having dispersed therein PTFE.

8. The laser working machine according to claim 7, wherein
   the partition wall portion comprises a metal seal and a shaft inserted through a through hole provided at the metal seal, and
   the metal layer and PTFE are provided at a surface of the through hole of the metal seal and a surface of the shaft portion opposed to the through hole.

9. The laser working machine according to claim 7, wherein
   the metal layer and PTFE form a film formed by an electroless plating method.

10. The laser working machine according to claim 7, wherein a volume content of the PTFE in the metal layer is equal to or larger than 15% and equal to or smaller than 60%.

11. The laser oscillating apparatus according to claim 2, wherein the resin is polytetrafluoroethylene (PTFE).

12. The laser oscillating apparatus according to claim 2, wherein the metal layer and resin form a film formed by an electroless plating method.

13. The laser oscillating apparatus according to claim 11, wherein a volume content of the PTFE at the metal layer dispersing the precipitated resin is equal to or larger than 15% and equal to or smaller than 60%.

14. A laser oscillating apparatus according to claim 1, wherein a portion of the precipitated resin is exposed on a surface of the metal layer.

15. A layer working machine according to claim 7, wherein a portion of the PTFE is exposed on a surface of the metal layer.

* * * * *